Figure 1:
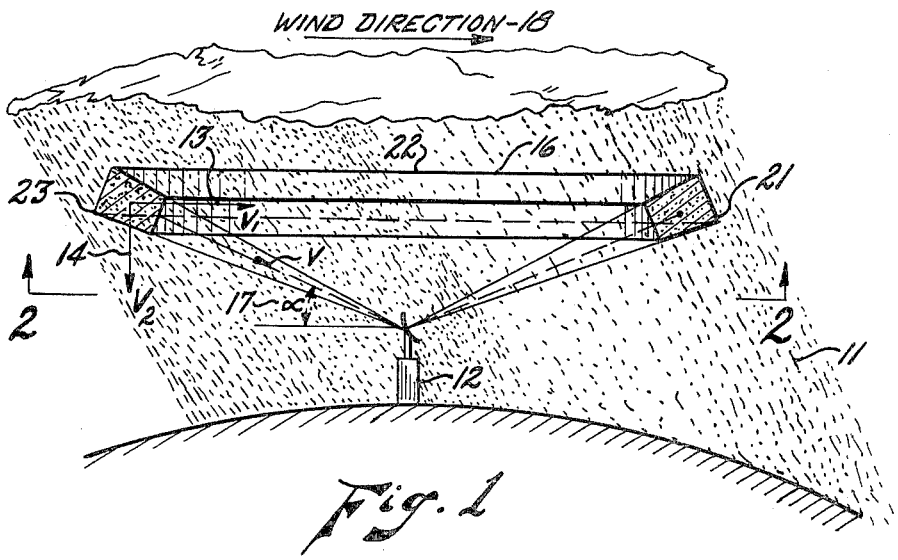

Oct. 12, 1965  R. M. LHERMITTE ETAL  3,212,085
ATMOSPHERIC MOTION COHERENT PULSE DOPPLER RADAR SYSTEM
Filed March 5, 1963  4 Sheets-Sheet 1

INVENTORS
ROGER N. LHERMITTE
AND DAVID ATLAS
BY
ATTORNEYS

United States Patent Office 3,212,085
Patented Oct. 12, 1965

3,212,085
ATMOSPHERIC MOTION COHERENT PULSE DOPPLER RADAR SYSTEM
Roger M. Lhermitte, Sudbury, and David Atlas, Newton Center, Mass., assignors to the United States of America as represented by the Secretary of the Air Force
Filed Mar. 5, 1963, Ser. No. 263,081
7 Claims. (Cl. 343—9)
(Granted under Title 35, U.S. Code (1952), sec. 266)

The invention described herein may be manufactured and used by or for the U.S. Government for governmental purposes without payment to us of any royalty thereon.

This invention relates to the measurement of atmospheric motion; and more particularly to the measurement of such motion utilizing pulse Doppler radar.

A conventional method of measuring wind velocity is "Rawin." This method employs balloons. A balloon is released and its movement is tracked with a radar beam as it rises. The horizontal motion of the balloon is then computed by means of the changing horizontal position as indicated by return echos from the balloon. Unfortunately, a great many balloons are needed to indicate periodic changes in wind velocity. Furthermore, the data received is necessarily a mean value, for the balloon rises continuously and at least two consecutive reflections are needed to compute horizontal velocity and the value derived represents the mean between reflections. Another requirement of previous pulsed Doppler wind measuring systems has been the need for more than one radar.

The present invention uses precipitation clouds or "chaff" targets as tracers of the wind. It is further anticipated that discontinuities of temperature and humidity at varying altitudes will be utilized for the same purpose. With an extremely sensitive radar it could be possible to use the present invention in clear air. Atmospheric inhomogeneities due to differences in temperature and humidity will act as a trace of the wind as opposed to the use of precipitation clouds. Motion in the ionosphere can also be determined by utilizing back scatter from ionized layers.

The present invention is very flexible. Practically instantaneous determinations of atmospheric motion can be obtained at will. Such could not be accomplished with conventional means, because determinations are tightly coupled with the motion of balloons. Twelve levels one thousand feet apart have been sampled in two minutes within a five-mile radius with the present invention. On the other hand, aforesaid conventional means required twelve minutes with a mean wind velocity of fifty miles per hour over a ten-mile area. Obviously as wind velocity increases, the mean velocity would necessarily spread over a much larger area. In this respect, the present invention is independent of wind velocity.

The accuracy of conventional wind velocity measurements is on the order of $\pm 1$ to $\pm 1.5$ meters per second. Doppler measurements have provided an accuracy of $\pm 0.5$ meters per second with equipment of average quality utilizing this method.

In addition to the ability of the present invention to provide an improved method for determining horizontal motion, it can also be utilized in determining the fall velocity of moisture particles, turbulence and the magnitude and direction of the wind shear vector acting upon a given sampled layer.

Precipitation particles have two components of velocity acting upon each particle, a horizontal component related to wind velocity and a vertical component related to vertical fall. Such vectors are depicted in FIG. 1. Cloud velocity can be regarded as a special case of the above, wherein vertical fall velocity of the particle is approximately zero. Vertical fall varies considerably with different particles. For snow, the range is from 0.3 to 2 meters per second; for rain, the range is from 4 to 9 meters per second.

The reflections from a preselected altitude are not confined to a point but more properly to a cube in space. As will be demonstrated more fully, this principle gives rise to the principle that reflected Doppler signals contain a spectrum of frequencies. This spectrum is broadened by several factors; variations in vertical fall velocities, the finite width of the radar beam, turbulence of a small scale contained within the sampled volume, and wind shear. Normal variations in vertical fall and the finite width of the radar beam produce negligible broadening. Turbulence of a small scale having a variety of random directions produce noise-like oscillations that are readily distinguished from broadening produced from other causes. Wind shear produces definite broadening. Considering the foregoing and other features that will be more fully discussed, wind shear and turbulence can be determined as well as horizontal motion.

In view of the foregoing, an object of this invention is to provide a flexible method for determining atmospheric motion.

Another object of this invention is to determine atmospheric motion with greater accuracy than has been hitherto achieved with conventional methods.

Another object of this invention is to determine atmospheric motion with the use of only one radar.

Another object of this invention is to provide a measure of wind shear and turbulence in addition to wind velocity.

Other objects and advantages will best be understood by reference to the following description taken in connection with the accompanying drawings in which:

FIG. 1, a pictorial view of radar scanning the atmosphere.

Figure 2:
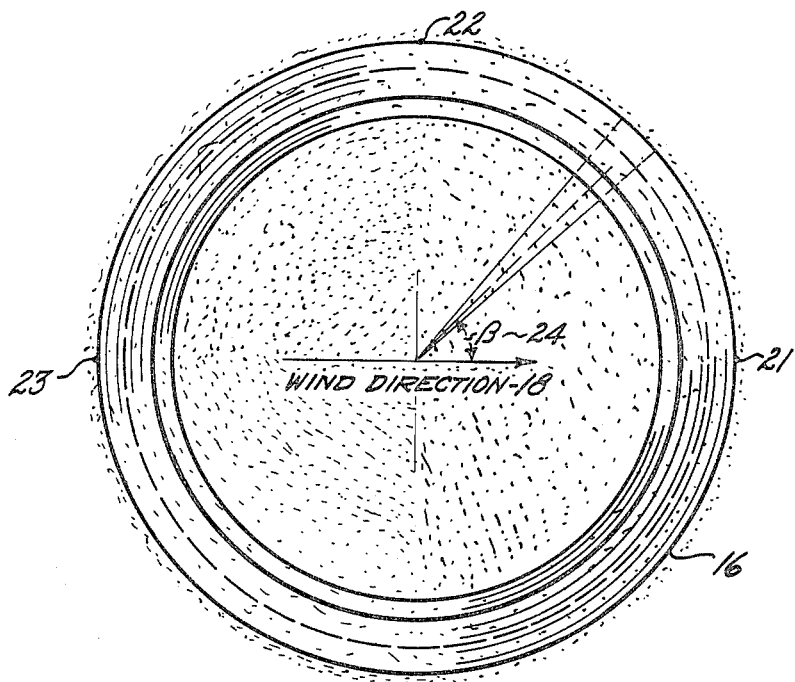

FIG. 2, a sectional view of FIG. 1.

Figure 3:
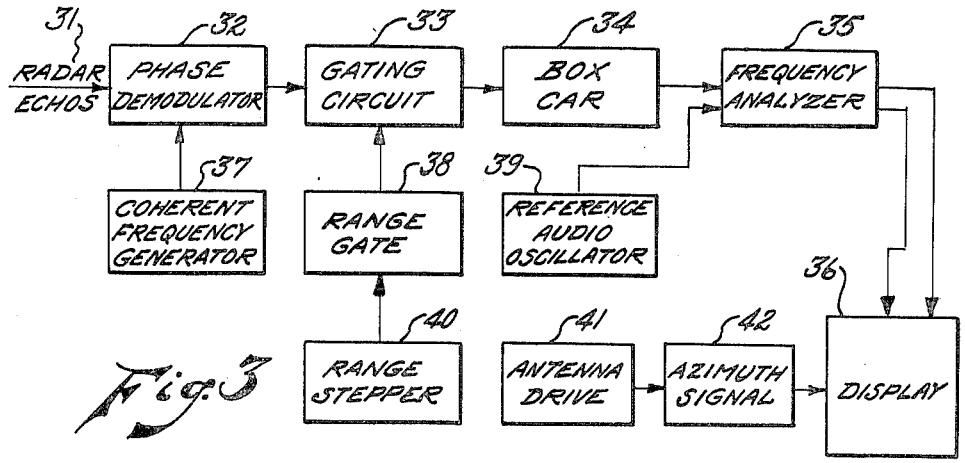

FIG. 3, a block diagram of an embodiment of this invention.

Figure 4:
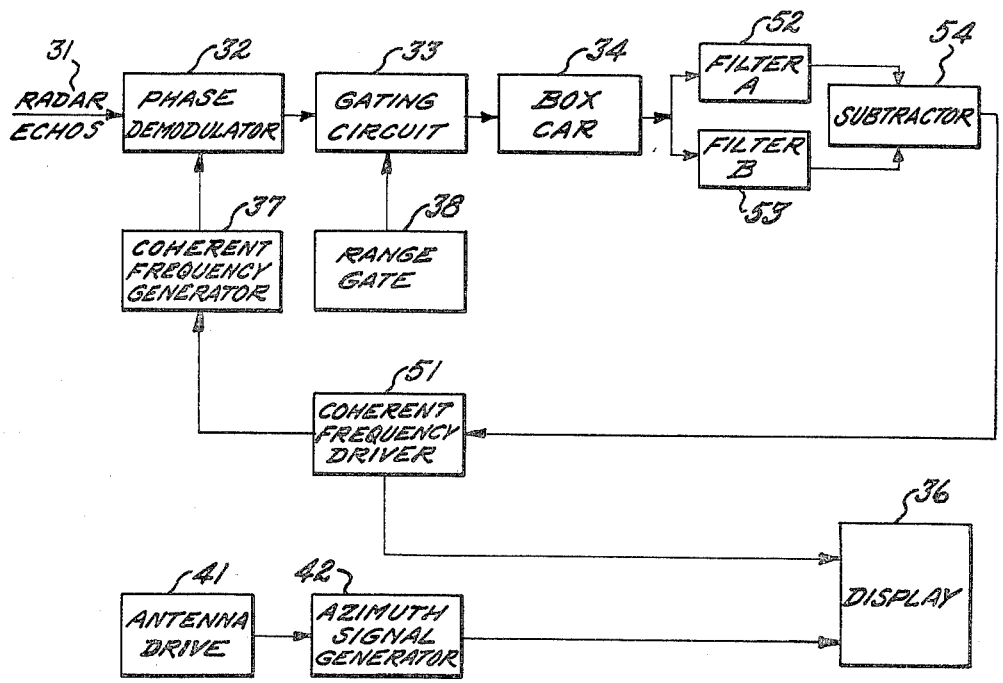

FIG. 4, a block diagram of a second embodiment of this invention.

Figure 5:
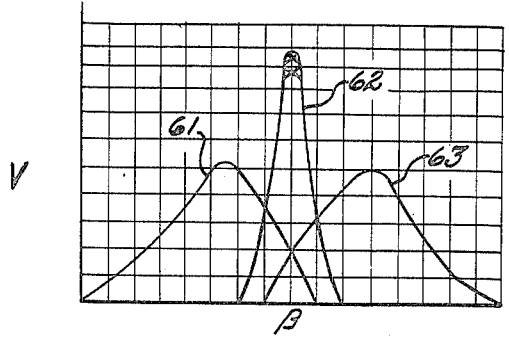

FIG. 5, a distribution of the frequencies in connection with the subtraction network of FIG. 4.

Figure 6:
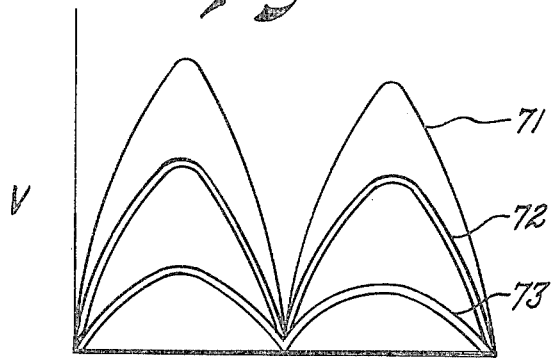

FIG. 6, a comparative display of scans taking various harmonics.

Figure 7:
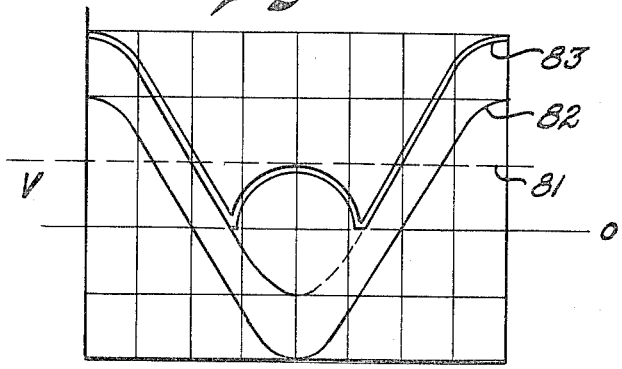

FIG. 7, a display illustrating its component parts; and

Figure 8:
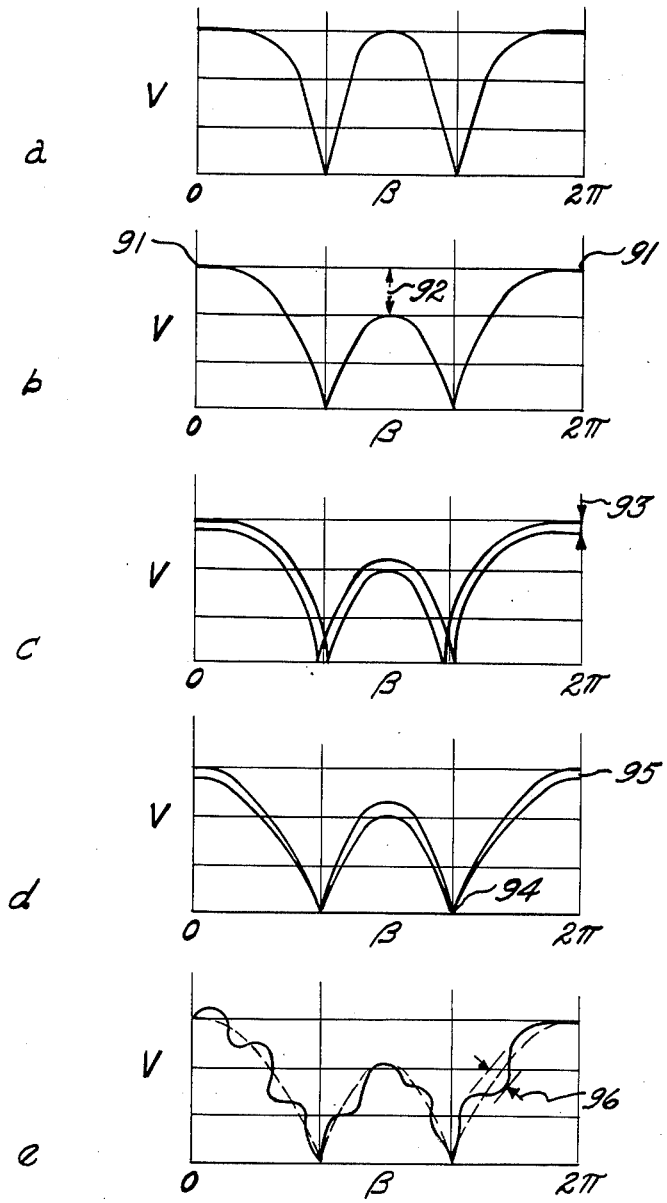

FIG. 8, several displays illustrating various effects due to differing atmospheric conditions.

A pulse Doppler radar is used to radiate and receive signals. A "C" band pulse Doppler radar called "porcupine" having a P.R.F. of 10 kc., a conical beam of 2°, peak power of 16 kw., and 0.8 $\mu$sec. pulse width worked satisfactorily. Reflected signals represent the power density of water droplets having a radial velocity.

With the beam tilted at elevation 17, FIG. 1, the velocity of the particles will be represented by:

$$V = V_2 \sin \alpha + V_1 \cos \alpha \cos \beta$$

wherein $\alpha$ = the angle of elevation
$\beta(2)$ = the azimuth angle relative to wind direction
$V_f 14$ = vertical fall velocity
$V_h 13$ = horizontal wind velocity This equation is represented vectorially in FIG. 1.

By rotating the azimuth in a P.P.I. scan (angle $\alpha$–17 and Range-R, held constant, V–15 will vary with $\beta$–24 as is shown in FIG. 7 at an altitude of $R \sin \alpha$.

It will be observed in FIG. 7 that curve of velocity V vs. angle $\beta$, 83, has two maxima, wherein $$V = V_h \cos \alpha + V_f \sin \alpha$$

and $V = V_h \cos \alpha - V_f \sin \alpha$, respectively. Curve 83 has two nulls corresponding to points 23 and 21 (FIG. 2), respectively, wherein $V_f \sin \alpha = V_h \cos \alpha \cos \beta$ (when $V_h \cos \beta > V_f \sin \beta$ which is the usual case).

Referring to FIG. 3, phase demodulator 32 provides an output voltage with amplitude proportional to the phase of the Doppler shifted echo. As the target (the droplets within the given cube in space 16, FIG. 1) moves radially with respect to the radar, the output voltage will oscillate sinusoidally at a frequency identical to the Doppler frequency. Gating circuit 33 permits the output of the phase demodulator to pass signals corresponding to a preselected range. Since the radar beam is tilted to a preselected angle $\alpha$, the resulting signals that finally arrive at box car 34 represent motion that exists at an altitude determined by the given range and elevation angle.

The phase as represented by the echo pulse amplitude is sampled by gating circuit 33 only once each pulse period. Box car 34 therefore stretches each echo pulse for a duration corresponding to the inter-pulse period. The output of box car 34 is a rectangular shaped stepped waveform having a primary frequency corresponding to the doppler frequency and an amplitude proportional to the amplitude of the echo at this frequency.

The box car output is analyzed by scanning frequency analyzer 35. The analyzer scans the entire Doppler frequency range linearly with time starting at zero frequency and increasing to a frequency equal to one-half the pulse repetition frequency. The synchronizing signal from analyzer 35 starts vertical trace of display 38 moving with the time such that the vertical position of the trace is a function of Doppler frequency which is proportional to radial velocity.

Output of analyzer 35 activates intensity modulation grid of display 38 illuminating the screen such that the frequency content of the box car output appears on the screen. Azimuth signal 42 synchronized with antenna drive 41 determines the horizontal position of the display trace such that the frequency content of box car output is related to the azimuth of the return echo 31.

A requirement of the frequency analyzer is that the frequency analyzer scan the entire frequency range very rapidly relative to the azimuth scan rate. In other words, the azimuth must appear nearly constant when compared with the scan rate of the frequency analyzer. "Rayspan," a parallel filter type of frequency analyzer produced by the Raytheon Manufacturing Company, will provide satisfactory results. A panoramic type or a coherent memory filter type will also operate effectively, although perhaps at a slower rate. Display device 36 can be an oscilloscope, an x-y plotter, or a polar-coordinate plotter.

A marker pulse, corresponding to specified velocities, generated by reference audio oscillator 39 is applied to the display device 36 by way of frequency analyzer 35. In this way instantaneous velocities can be determined readily.

Referring to FIG. 8, various velocity azimuth patterns that appear on display device 36 are shown. A complete sweep of the antenna is presented in each instance. The velocity should be an absolute value to aid in the determination of basic reference points with accuracy.

FIG. 8a is a display that will appear with a steady wind and no vertical motion. FIG. 8b is an idealized curve when vertical motion is present (i.e. raining or snowing). Point 91 represents the larger amximum, the point where the wind is directed toward the radar antenna. Difference 92 between the two curves is due to vertical motion. FIG. 8c shows the conditions of steady wind and a vertical motion (raining) found in practice. Thickness of curve 93 represents the distribution in vertical motion of individual droplets within a given cube in space. FIG. 8d shows the condition of wind shear. The width of the spectrum is a function of azimuth. Maximum width 95 is the point in space where the wind shear vector is parallel to the radar beam. Minimum width 94 is the point in space where the wind shear vector is normal to the radar beam. FIG. 8e shows a display when a great deal of horizontal turbulence is present. The magnitude of variation 96 is a measure of the turbulence.

Referring once more to FIG. 7 curve 83 has two maxima and two minima. Curve 83 is the algebraic sum of curves 82 and 81. Curve 83 represents equation $$V = V_f \sin \alpha + V_f \cos \alpha \cos \beta$$

The vertical ($V_f \sin \alpha$), component of radial velocity V is represented by straight line 81. This line is straight because the moisture at a specified level is presumed uniform. If this were not the case, the resulting curve would be somewhat distorted but nevertheless useful for it could be fitted to a curve as the one presented. The horizontal component ($V_h \cos \alpha \cos \beta$) of V, the radial velocity is represented by curve 82.

The direction of the wind from the pattern illustrated in FIG. 7 can be determined by:

(1) The direction of larger maximum, or
(2) The mid-point between the direction of the two nulls plus 180°.

The speed of the wind from the above pattern can be determined by:

(1) $$\frac{V_1 + V_2}{2 \cos \alpha}$$

where $V_1$ and $V_2$ are the speeds corresponding to the maxima 83 and 85, $\alpha$ is the angle of elevation of the beam, or (2) $$\frac{V_f \tan \alpha}{\cos \beta_0}$$

where $V_f$ is the particle fall velocity and $\beta_0$ is the azimuth angle of either of the two nulls.

Wind shear and turbulence can be determined as pointed out earlier from the patterns as shown in FIG. 8.

In order to speed up operations, range stepper 40 causes range gate 38 to gate gating circuit 33 at intervals corresponding to azimuth position from 10 to 20° apart. Such gating is possible because the pattern is related to a well defined sinusoidal wave; consequently, it is unnecessary to record velocity continuously. Substantially equal accuracy can be attained by recording at intervals of 20° as can be obtained recording continuously.

A second embodiment is shown in FIG. 4. Here the output of box car 34 is applied to filter A (52) and filter B (53). In turn, the output of these filters is applied to subtractor 54. Output of subtractor 54 represents the output of filter A minus the output of filter B. The output is a positive signal and is applied to coherent frequency driver 51. Coho driver 51, in turn, causes coherent reference frequency of coherent frequency generator 37 to be reduced before it is applied to phase demodulator 32. The above action results in a substantial increase in the frequency difference between the coho reference frequency and the Doppler shift frequency. The difference is illustrated in FIG. 5. The spectrum is shifted toward 61, the output of filter B, and away from 63, the output of filter A. The reverse action will occur if the output of filter B is greater than that of filter A. The process continues until the output of both filters balance.

Resulting from the above action, the frequency difference between the coherent reference frequency shifted echo and Doppler frequency is continuously tracked. The voltage of the coho driver 51 determines the coho frequency which is a measure of the Doppler frequency which, in turn, is a measure of target velocity. This voltage may be applied to display 56 and a display of radial velocity vs. azimuth similar to that shown in FIG. 8b will appear.

It will be noted, however, that the display will not show a broad-band as does the former embodiment. This output is a measure of the central velocity even when the Doppler spectrum is broad. In that wind shear and turbulence largely determine broadness, it may be interpreted as an advantage, if they are not required. There is no need to bisect the broad-band to obtain the central velocity as is required in the previous embodiment and illustrated in display shown in FIG. 8c. With the first embodiment, information concerning wind shear and turbulence is available. With the second embodiment, such information is not available.

It was stated above that there was a certain broadness due to a distribution of the vertical fall velocities of the individual droplets within the specified cube in space that the radar return echos represent. Such broadness was illustrated in FIG. 8c. Referring to FIG. 6, the broadness is again shown in curve 73. However, harmonics of the same display are also shown in curves 72 and in 71. The higher the harmonic the narrower the ban becomes. It now becomes apparent that greater accuracy can be obtained by merely selectively filtering the output of frequency analyzer 35 such that only a given harmonics appear. The velocity obtained from the third harmonic must necessarily be divided by three, and the fifth by five, and so forth. The limit on the harmonic used is the clarity of its display. The seventh harmonic has given a very satisfactory display in practice.

While we have described the above principles of our invention in connection with specific apparatus, it is to be clearly understood that this description is only made by way of example and not as a limitation on the scope of our invention as set forth in the objects thereof and in the accompanying claims.

What is claimed is:

1. In a system for determining atmospheric motion, pulse Doppler radar means for radiating and receiving return echo signals from the atmosphere, means for demodulating said return echo signals from the atmosphere with reference to coherent signals, means for gating said signals so that signals from other than a predetermined range are rejected, means for stretching said gated signals over a prescribed interval, means for analyzing said stretched signals for frequency content, means for generating signals related to antenna position, and means for presenting said analyzed signals in reference relationship to said antenna-related signals.

2. The system described in claim 1 including means for operating said gating means in intervals corresponding to a predetermined angle of azimuth.

3. The system described in claim 2 including means for displaying a marking signal simultaneously with said analyzed signals.

4. In a pulse Doppler radar system for determining atmospheric motion, pulse Doppler radar means for radiating and receiving return echo signals from the atmosphere, means for demodulating said return echo signals from the atmosphere with reference to coherent signals, said coherent signals being provided by a coherent reference frequency driver, means for gating said demodulated signals so that signals from a predetermined range are not rejected, means for stretching said gated signals with respect to the interval between pulses, means for applying said stretched signal to dissimilar filters, means for subtracting the outputs of said filters from one another; means for simultaneously, displaying the difference between said outputs and applying said output to the coherent reference frequency driver thereby changing said coherent reference signal and the consequent Doppler shift signals, said means continuing to operate until a minimum difference appears at the output of said dissimilar filters.

5. Apparatus for determining atmospheric motion comprising in combination, pulse Doppler radar means for radiating and receiving echo signals from the atmosphere, phase demodulator means, coherent reference frequency driver means, said demodulator means, coherent reference frequency driver means, said demodulator means comparing signals from said radar means with respect to signals from said coherent driver means, gating circuit means, range gate means, said range gate means controlling said gating circuit means such that said gating circuit gates said demodulated signals, box car means, said box car means stretching said gated signals, scanning frequency analyzer means, said scanning frequency analyzer means analyzing said stretched signals, display means, antenna driver means, azimuth signal generating means responsive to position signals from said antenna drive, said display means displaying said analyzed signals with respect to said azimuth signals.

6. Apparatus as described in claim 5 wherein said combination further includes reference audio oscillation means, said reference audio oscillator means supplying marker frequency signals to said frequency analyzer for display with the output of said analyzer on said display means.

7. Apparatus as described in claim 6 wherein said combination further includes range stepper means, said range stepper means controlling said range gate means such that said range gate is automatically increased to display velocity pattern over a predetermined range of altitudes.

References Cited by the Examiner

UNITED STATES PATENTS

| | | | |
|---|---|---|---|
| 2,421,020 | 5/47 | Earp | 343—5 |
| 2,679,042 | 5/54 | McMullen | 343—7.7 |

CHESTER L. JUSTUS, *Primary Examiner.*